United States Patent [19]

Joffe et al.

[11] Patent Number: 4,467,198

[45] Date of Patent: Aug. 21, 1984

[54] RADIATION SHIELDING ARRANGEMENT FOR COATING THICKNESS MEASUREMENT DEVICE

[75] Inventors: Boris B. Joffe, Buffalo; Jerry J. Spongr; Boris N. Ivasyuk, both of Tonawanda, all of N.Y.

[73] Assignee: Twin City International Inc., Amherst, N.Y.

[21] Appl. No.: 304,673

[22] Filed: Sep. 22, 1981

[51] Int. Cl.$^3$ ........................................ G01N 23/203
[52] U.S. Cl. .............................. 250/308; 250/358.1; 250/498.1; 250/515.1
[58] Field of Search ................. 250/308, 515.1, 358.1, 250/359.1, 498.1, 497.1; 378/89, 117, 145, 86, 88, 90, 54, 55, 160

[56] References Cited

U.S. PATENT DOCUMENTS

| | | | |
|---|---|---|---|
| 2,790,087 | 4/1957 | Williams | 250/308 |
| 2,932,744 | 4/1960 | Lehman | 378/89 |
| 3,488,495 | 1/1970 | Schneeman | 378/117 |
| 3,505,520 | 4/1970 | Stewart et al. | 378/88 |
| 3,737,661 | 6/1973 | Applegate | 378/147 |

Primary Examiner—Alfred E. Smith
Assistant Examiner—Carolyn E. Fields
Attorney, Agent, or Firm—Christel, Bean & Linihan

[57] ABSTRACT

A shielding arrangement for a coating thickness device utilizing the radiation backscatter technique. An isotope housing is provided having an aperture through which radiation can pass. A removable cover shield is attached to the housing to cover the aperture when the device is not in use. Means are provided to remotely remove the cover shield from the housing and expose the aperture. A secondary shield carried by the device is provided to swing into and out of covering relationship to the aperture to block radiation passage through the aperture between measurements. The secondary shield is operatively connected with the operating handle of the device to coordinate movement of the secondary shield with the position of the isotope housing. A tertiary shield, which can be of transparent plastic material, is provided between the measuring zone of the device and the operator to provide additional shielding during the times the secondary shield is not in covering relationship with the aperture.

24 Claims, 6 Drawing Figures

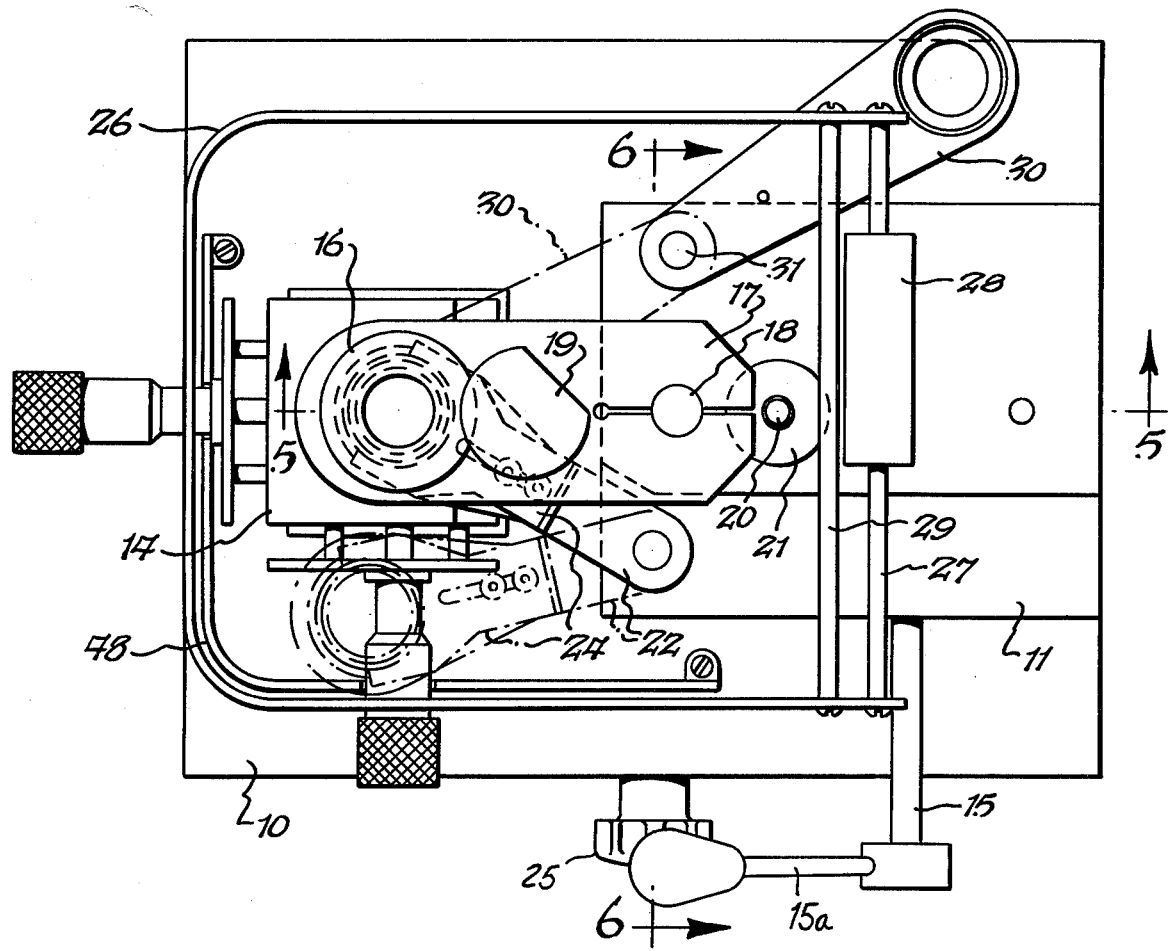
Fig. 2.
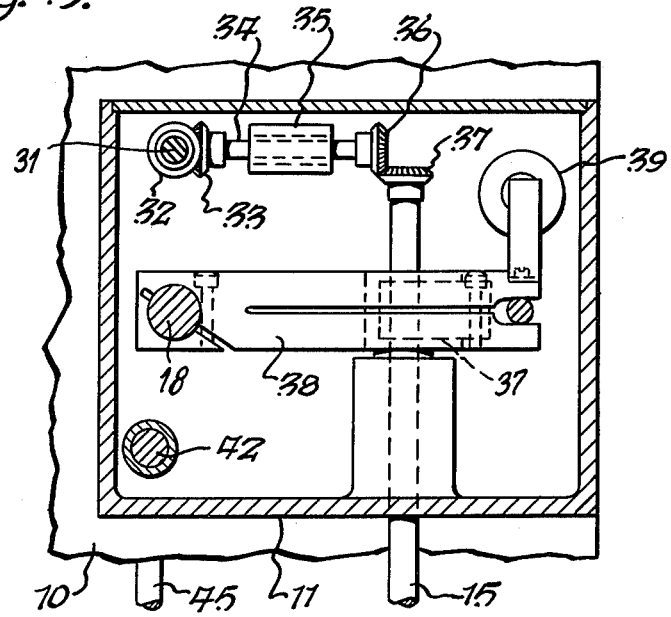
Fig. 3.
Fig. 4.

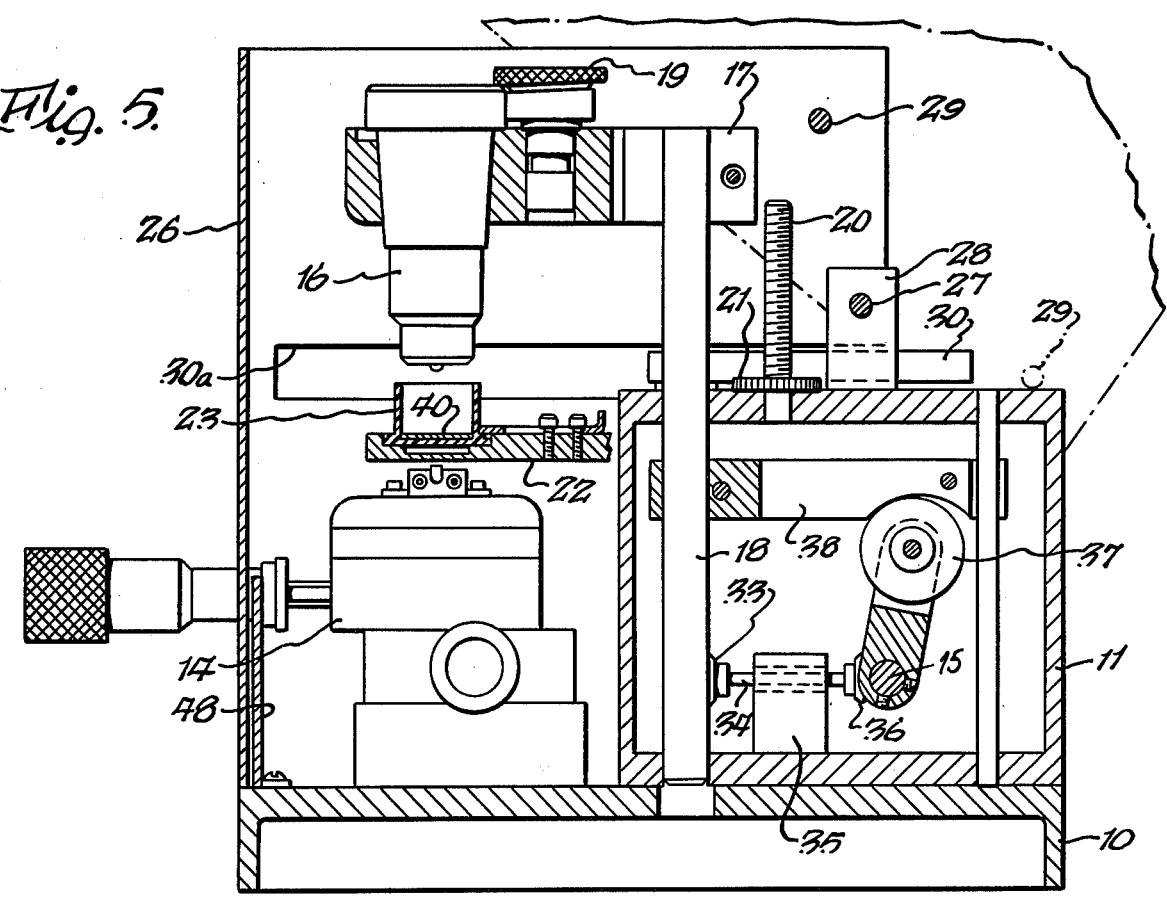

4,467,198

RADIATION SHIELDING ARRANGEMENT FOR COATING THICKNESS MEASUREMENT DEVICE

BACKGROUND OF THE INVENTION

This invention relates to coating thickness measurement devices utilizing the radiation backscatter technique, and more particularly to a shielding arrangement for use with such devices to shield an operator from stray radiation which will emanate from such devices during the course of their use.

Various types of coatings are commonly applied to small electronic parts such as connectors, contacts for connectors, and the like. Because of the critical nature of the coating thickness in such applications, it is necessary that the thickness be determined with a high degree of precision. The use of beta radiation backscatter has been found to provide the necessary degree of precision required for the accurate measurement of such thicknesses. As a consequence, several devices have been developed to apply the beta radiation backscatter technique to the measurement of coating thicknesses on various types of electronic parts, such as, for example, on printed circuit boards, and also in other applications. For example, U.S. Pat. No. 3,529,158 shows one type of portable probe in which a base member receives a guide for aligning the member with the area to be measured, the guide then being removed from the member and replaced by a measuring head. U.S. Pat. No. 3,720,833 shows another type of portable probe in which a spring biased locator carried by the probe housing is retracted within the housing by a cam arrangement in response to the lowering of the measuring probe unit into engagement with the workpiece.

Although the radiation utilized in such beta radiation backscatter measurement techniques is of a relatively low level, and even though the penetration power of beta radiation is substantially less than that of gamma radiation, there are times when it may be necessary or desirable to provide some degree of shielding in connection with such a device in order to minimize the exposure of an operator of such devices to beta radiation.

BRIEF SUMMARY OF THE INVENTION

It is an object of the present invention to provide a shielding arrangement for use with measurement devices utilizing the beta radiation backscatter technique.

It is another object of the present invention to provide a shielding arrangement for such devices whereby the shield may be conveniently positioned with respect to an aperture through which the radiation passes.

It is a further object of the present invention to provide a radiation shield arrangement for such devices wherein such shielding is sufficient to attenuate such radiation to a predetermined exposure level.

It is still a further object of the present invention to provide a shielding arrangement for such devices wherein a plurality of shields is provided to minimize the stray radiation during the various phases of the measurement operation.

Briefly stated, in accordance with one aspect of the present invention, a shielding arrangement is provided in a device for measuring coating thickness by the beta radiation backscatter technique, the device including a movable housing which contains a radiation source and an aperture through which the radiation can pass, the shielding arrangement including a first shield adapted for placement over the aperture and in engagement with the housing, the shield being of a suitable material and thickness sufficient to preclude the passage of beta radiation therethrough. The first shield is removable in order to permit the radiation to pass through the aperture and against the surface of the part carrying the coating, the thickness of which is to be measured. A second shield is provided which is adapted to be brought into covering relationship with respect to the aperture when a measurement is not being made, and which is movable out of covering relationship with the aperture when it is intended to make a thickness measurement.

BRIEF DESCRIPTION OF THE DRAWINGS

FIG. 2 is a plan view of the device shown in FIG. 1.

FIG. 3 is a transverse cross-sectional view, partially broken away, taken through the mechanism enclosure of the device shown in FIGS. 1 and 2 to illustrate the internal arrangement of the drive means for moving the isotope-containing housing and for moving a swingable shield into and out of operating position.

FIG. 4 is a fragmentary view, partially in section, showing means for holding in position under the radiation aperture either a closure shield or, alternatively, a calibration standard.

FIG. 5 is a cross-sectional view taken along the line 5—5 of FIG. 2.

FIG. 6 is a cross-sectional view taken generally along the line 6—6 of FIG. 2.

DESCRIPTION OF THE PREFERRED EMBODIMENTS

Figure 1:
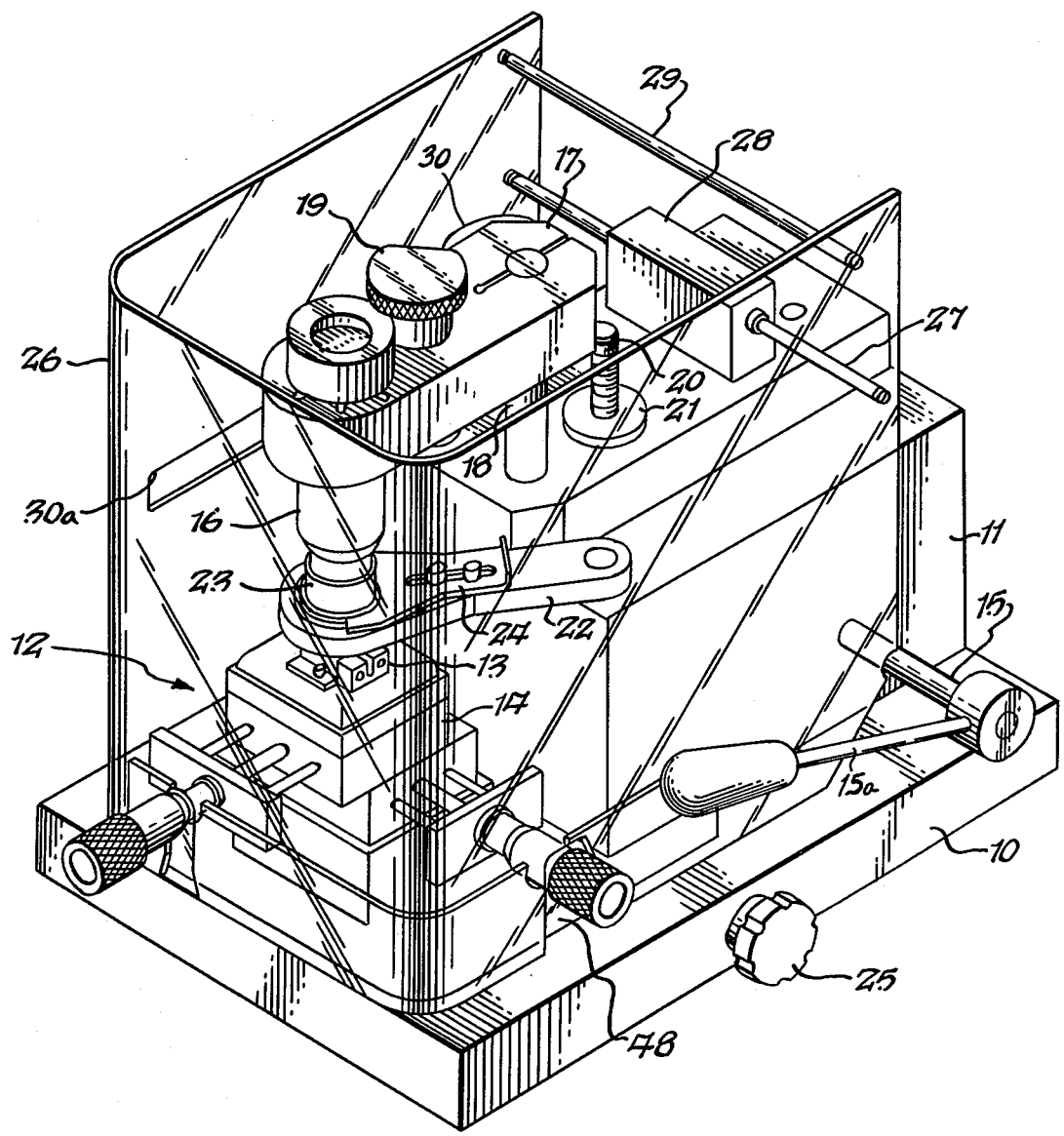
FIG. 1 is a perspective view of a coating thickness measuring device utilizing the beta radiation backscatter technique and showing a shielding arrangement in accordance with the present invention.

Referring now to the drawings, and particularly to FIG. 1 thereof, there is shown a coating thickness measuring device very similar to that shown and described in a copending application entitled, "COATING THICKNESS MEASURING DEVICE," Ser. No. 257,975, filed Apr. 24, 1981, the disclosure of which is hereby incorporated herein by reference, and which application is commonly owned by the assignee of the present invention.

As shown in FIG. 1, the device includes a base 10 upon which is positioned a mechanism enclosure 11 and a part positioning system 12. The part positioning system shown is a fixture 13 which is positioned on an X-Y slide 14 secured to base 10. The X-Y slide can be of a readily commercially available type, if desired, and is adapted to move fixture 13 in directions at right angles to each other in order to permit proper placement of the part for subsequent measurement. Alternatively, a rotary slide, a magnetic fixture holder such as is disclosed in the copending application referred to hereinabove, or any other type of positioning device could also be used.

An operating handle 15a is secured to control shaft 15, the purpose of which is to raise and lower an isotope housing 16, which is supported in a housing mount 17 carried by a shaft 18 which extends into and is carried by mechanism enclosure 11 for vertical sliding movement. The interrelationship between operating handle 15a and shaft 18 will be hereinafter described in more detail. As shown, housing mount 17 includes a cam-type rotary lock 19 which is adapted to hold isotope housing 16 firmly in position with respect to mount 17.

Positioned within isotope housing 16 is an isotope (not shown) providing a source of beta radiation. The radiation source is positioned in the lower portion of housing 16 adjacent an aperture (not shown), and above the radiation source there is provided a radiation detection means (not shown) which can be, for example, a standard Geiger-Muller tube for detecting radiation backscatter. The output of the Geiger-Muller tube can be connected to a suitable display device (not shown), which can be a standard meter of known type, or, if desired, it can be a direct digital readout, as will be readily appreciated by those skilled in the art.

A stop mechanism is mounted on the enclosure 11 and comprises an adjusting screw 20 and an adjusting collar 21 which can be raised or lowered along the axis of adjusting screw 20 to provide a vertical stop for housing mount 17. Although not normally utilized when the device is in its measuring mode, the adjusting collar can be utilized for the proper orientation of a positioning microscope (not shown) which can be positioned in mount 17 in place of housing 16 to facilitate positioning of the parts to be measured directly beneath the central axis of isotope housing 16. The use of such a positioning microscope is described in the co-pending application referred to hereinabove.

Swingably connected to mechanism enclosure 11 is a supporting arm 22 which is adapted to be brought into and out of underlying relationship with isotope housing 16. As shown in FIG. 1 supporting arm 22 is in position beneath isotope housing 16 and carries a closure shield 23, which can be formed of plastic materials. The closure shield is adapted to slidably fit over the end of isotope housing 16 in which the aperture is formed, and which includes a base portion which overlies the end of isotope housing 16 so as to cover the aperture. Preferably as shown in FIG. 5, the portion of closure shield 23 overlying the aperture in isotope housing 16 includes a radiation shield in the form of a disc 40, which can be of metallic construction, or any other suitable material which provides sufficient attenuation for the radiation which would otherwise emanate from the aperture in isotope housing 16. Supporting arm 22 includes a slidable yoke 24 which is so configured as to overlie an outwardly extending flange of closure shield 23 to retain it in position with respect to supporting arm 22. Slidable yoke 24 is also slidable rearwardly to permit the removal of housing 16 with closure shield 23 in covering relationship to the aperture, if desired. Additionally, supporting arm 22 also can carry a calibration standard (not shown) having a known thickness of the coating to be measured, which can be in the form of a coated disc carried by supporting arm 22 and which can be positioned in underlying relationship to isotope housing 16 to permit calibration of the readout device. The actuation of supporting arm 22 into and out of its position in underlying relationship with isotope housing 16 can be accomplished by control knob 25, which is interconnected therewith in a manner to be hereinafter described, or it can be accomplished by other means.

Also shown in FIG. 1 is another shielding means comprising a partial enclosure 26, which is positioned between isotope housing 16 and the operator for additional attenuation of stray radiation, in order to provide a shield for the operator at those times when isotope housing 16 is not in contact with shield arm 30, and shield 23 is not in place, at which times stray radiation can pass from the measuring zone. Enclosure 26 can be provided with an opening 30a in a side thereof to permit arm 30 carried by enclosure 11 to swing therethrough, and can be formed of a number of materials, so long as the materials are sufficient to stop stray radiation. Although the precise materials will be dependent upon the type of isotope utilized, which will influence the strength of the radiation to be encountered, it has been found that metals or plastics are sufficient to provide the desired radiation shielding. Although it is not essential that enclosure 26 be transparent, since measurement can be made without the operator viewing the part as the coating thickness is being determined, it is desirable to provide transparency so that observation of the part during the measuring process can be maintained. Depending upon the strength of the radiation source, transparent plastics such as Plexiglass, Lexan, and the like would be suitable, as would ordinary window glass, although the latter is considerably heavier than the former.

Enclosure 26 extends across the front of the device and along two of the sides and carries a shaft 27 which is supported in a bearing block 28 which, in turn, is secured to mechanism enclosure 11. Shaft 27 permits enclosure 26 to be pivoted into and out of position with respect to the measuring zone to permit the removal or insertion of parts to be measured. A stop shaft 29 can be provided to limit the rearward travel of enclosure 26.

A further radiation shield can be provided for interposition between the aperture in isotope housing 16 and fixture 13 during those times when a measurement is not in progress. Such an additional shield can be provided by a shield arm 30 which is pivotally secured to mechanism enclosure 11 by means of shaft 31 as shown in FIG. 2. As in the case of supporting arm 22, shield arm 30 is positioned to be swung into and out of covering relationship with the aperture in isotope housing 16. Thus shield arm 30 is adapted to be swung from the dot dash position shown in FIG. 2 through opening 30a in enclosure 26, to an outlying position as shown in solid lines in FIG. 2 as the isotope housing 16 is moved from a raised inoperative position to a lowered operative or measuring position, and is also adapted to be swung to the underlying position relative to the aperture in housing 16 as illustrated in dot dash lines in FIG. 2 when isotope housing 16 has been retracted to its upper position after a measurement has been made. As shown more clearly in FIG. 5, shield arm 30 is positioned in a plane which is spaced upwardly from the plane in which supporting arm 22 is positioned. Additionally, shield arm 30, which can be made of any convenient material, such as, for example, aluminum, is provided with a shield element, which can be a steel disc, which is positioned in shield arm 30 so as to be in covering relationship with the aperture in housing 16 to effectively block radiation therefrom during those times when isotope housing 16 is spaced from fixture 13.

The drive means for swinging shield arm 30 into and out of its position with respect to isotope housing 16 is shown in FIGS. 3 and 6. As shown, shaft 31 on which shield arm 30 is positioned passes into and within mechanism enclosure 11 and terminates in a bevel gear 32, which is in driving engagement with a cooperating bevel gear 33 carried by a shaft 34 which is positioned at right angles to shaft 31. Shaft 34 is rotatably carried in a boss 35 and at its opposite end carries another bevel gear 36, which, in turn is in driving engagement with bevel gear 37 carried by shaft 15a. Thus, as operating handle 15 is moved in a counterclockwise direction as viewed in FIG. 1, shaft 31 turns in a clockwise direction as viewed in FIG. 3, thereby moving shield arm 30 out of position and away from isotope housing 16. Although shown and described in terms of of a gear train, other drive means can be provided to actuate swing arm 30 into and out of position, such as belts, links, servomotors, and the like.

The internal arrangement for moving housing mount 17 into and out of position with respect to fixture 13 is shown in FIG. 5. Connected to the shaft 15 on which operating handle 15a is positioned is a cam roller 37, which is cooperatively engaged with a cam follower 38 which is secured to shaft 18. Thus, when control shaft 15 is rotated in a counterclockwise direction as viewed in FIG. 5, cam roller 37 initially urges cam follower 38 upwardly until cam roller 37 rotates sufficiently far to the left, whereupon the weight of shaft 18 and housing mount 17 and housing 16 will cause the assembly to descend vertically downwardly. The rate of descent of housing mount 17 is controlled by means of a dashpot 39 (see FIG. 3), which is essentially a pneumatically operated piston-cylinder arrangement having a needle valve to control the escape of air from the cylinder, and thereby control the rate of descent of housing mount 17 to provide a gentle contact between isotope housing 16 and the part having the coating, the thickness of which is to be measured. Again, although disclosed in terms of a cam roller and cam follower arrangement, it will be apparent to those skilled in the art that other means to move housing mount 17 can be employed, if desired.

As shown in FIG. 5, means are provided to hold supporting arm 22 in position so that it underlies isotope housing 16. Thus, a limit arm 41 is secured to the shaft 42 to which supporting arm 22 is secured, the limit arm being adapted to contact a stop member 43 which is provided with a magnet 44 to securely hold limit arm 41 in the position shown in full lines in FIG. 2.

The drive arrangement between control knob 25 and supporting arm 22 can be as shown in FIG. 6, wherein control knob 25 is secured to shaft 45, which carries a bevel gear 46 in meshing engagement with a cooperating bevel gear 47, which, in turn, is carried by upwardly extending shaft 42 to which supporting arm 22 is secured.

In the embodiment shown in the drawings, an X-Y slide 14 is provided, which includes a pair of micrometer adjustments, the micrometer barrels having a length which extend beyond and through enclosure 26. In order to provide an additional barrier to radiation, an optional inner shield 48 can be provided adjacent the micrometer barrels to cover the necessary notches 49, 50 which are provided in enclosure 26 to permit it to be pivoted rearwardly. If a relatively low energy isotope is employed, shield 48 can be omitted, if desired.

In operation, part fixture 13 can be properly positioned with respect to the axis of isotope housing 16 by means of the microscope arrangement disclosed in the co-pending application referred to hereinabove. After the fixture and its associated part are properly positioned, the microscope is removed from housing mount 17 and adjusting collar 21 is rotated to cause it to move downwardly along adjusting screw 20 until it is in a position in which it does not impede contact by isotope housing 16 with the part to be measured. Shield 26 is moved into position between the measuring zone and the operator. Isotope housing 16, which includes a suitable source of radiation and which carries a closure shield 23, can be positioned in housing mount 17 and restrained from upward movement relative to mount 17 by means of lock 19. At this point operating handle 15a is moved to its rearmost position to elevate mount 17. Supporting arm 22 is positioned beneath isotope housing 16 by means of control knob 25 and yoke 24, if not in its rearmost position, is moved rearwardly, away from the axis of isotope housing 16.

After supporting arm 22 is in position beneath housing 16, operating handle 15a is brought forward to cause housing 16 to descend until closure shield 23 is in contact with supporting arm 22. Slidable yoke 24 is moved forwardly to position it in engagement with closure shield 23 so that it overlies the rim thereof. Operating handle 15a is then moved rearwardly to elevate housing mount 17 once again, whereupon closure shield 23 is separated from isotope housing 16 and is retained by supporting arm 22. At that point supporting arm 22 can be swung out of the way by means of turning control knob 25 to position arm 22 adjacent mechanism enclosure 11.

When housing mount 17 has been elevated to its uppermost position, shield arm 30 is in underlying position with respect to the aperture in isotope housing 16. When it is desired to take a thickness measurement, operating handle 15a is rotated so that the arm thereof moves in a direction toward the operator, whereupon cam roller 37 urges cam follower 38 in an upward direction. After cam follower 38 has been so elevated with the consequent effect that housing mount 17, and, in turn, isotope housing 16 have been similarly elevated, further movement of control shaft 15 causes shield arm 30 to move outwardly from beneath isotope housing 16, and further movement of shaft 15 will move cam roller 37 so that it is substantially displaced from cam follower 38, the vertical movement of which is slowed by means of dashpot 39. The descent of isotope housing 16 is relatively gradual in order to minimize the impact force between it and the part having the coating, the thickness of which is to be measured. When housing mount 17 has descended to its lowermost position, wherein the aperture in isotope housing 16 is in contact with the coated part, the sensing tube senses the radiation backscatter and provides a suitable signal to an indicating device (not shown) to permit the operator to determine the coating thickness on the part.

Once the thickness determination has been made, the operating handle is moved in a direction away from the operator to cause cam roller 37 to bear against cam follower 38 and thereby lift the same as shaft 15 rotates. As cam follower 38 is elevated, shaft 18 and housing mount 17 are elevated at the same time, and because of the gearing arrangement between shield arm 30 and control shaft 15, shield arm 30 begins to move inwardly toward the axis of the isotope housing and when isotope housing 16 has reached its maximum upward position, shield arm 30 is directly beneath it. Further movement of operating handle 15a rearwardly to its extreme position causes cam roller 37 to engage the dispersion in cam follower 38, which, in turn, causes isotope housing 16 to descend slightly so that the aperture thereof is covered by shield arm 30, thereby providing shielding against stray radiation during the time when no coating thickness determination is being made.

During all the times the foregoing operations are taking place, enclosure 26 provides an additional shield between the measurement zone and the operator, thereby further minimizing the radiation to which the operator might otherwise be subjected. It is thus apparent that the present invention provides a shielding arrangement whereby three separate shielding means can be provided and utilized during the various phases of the operation of the device. The first shielding means is closure shield 23, which can be in position over the aperture of isotope housing 16 both before and after its insertion into housing mount 17. Upon removal of closure shield 23, shield arm 30 functions to prevent stray radiation when a measurement is not in progress. Additionally, enclosure 26 and optional inner shield 48 additionally provide shielding effective to attenuate radiation during those short periods of time between the disengagement of shield arm 30 from isotope housing 16. Thus, at each stage of operation of the device there is at least one radiation shield in position between the operator and the source of radiation.

While particular embodiments of the present invention have been illustrated and described, it will be apparent to those skilled in the art that various modifications can be made without departing from the spirit and scope of the present invention, and it is intended to cover in the appended claims all such changes and modifications that fall within the scope of the present invention.

What is claimed is:

1. In a coating thickness measurement device for measuring the thickness of a coating on coated parts, said device including a removable housing which contains a radiation source, the housing having an aperture through which radiation is permitted to pass and impact the coating, and the housing being movable between an operative position where the aperture may be uncovered to permit thickness measurement and an inoperative position where the aperture may be covered and means for supporting and positioning a part for measurement of coating thickness;
   first radiation shielding means which can be removably supported by said housing in covering relationship to said aperture; and
   second radiation shielding means carried by said coating thickness measurement device and which covers the aperture in the housing when the housing is in said inoperative position.

2. The coating thickness measurement device of claim 1 wherein said first radiation shielding means comprises a removable cover in the form of a closure shield positionable over the aperture in the housing, said closure shield having a shielding element positioned therewithin and adapted to cover said aperture to prevent the passage of radiation therethrough.

3. The coating thickness measurement device of claim 2 wherein said closure shield is slidable over the end of said housing in which said aperture is positioned, and which frictionally engages with said housing for removable, frictional fit therewith.

4. The coating thickness measurement device of claim 2 wherein said device carries removal means for removing said closure shield from said housing.

5. The coating thickness measurement device of claim 4 wherein said removal means comprises a movable member for receiving said closure shield and means for retaining said closure shield in said movable member.

6. The coating thickness measurement device of claim 4 wherein said removal means is remotely manually movable into and out of closure receiving position by means carried in said device.

7. The coating thickness measurement device of claim 6 wherein said means for moving said housing comprises a manually movable member carried by said device, said member being coupled to said removal means through a gear train.

8. The coating thickness measurement device of claim 1 wherein said removable housing is supported in said measurement device and said device carries means for moving said housing between said operative and inoperative positions.

9. The coating thickness measurement device of claim 1 wherein said second radiation shielding means is movably carried by said device and is movable into and out of covering position with respect to said aperture.

10. The coating thickness measuring device of claim 9 wherein the movement of said second radiation shielding means is coordinated with the movement of said housing so that the second shielding means is out of covering position with respect to said aperture when said housing is in its operative position.

11. The coating thickness measurement device of claim 1 wherein said device further includes moving means for moving said housing between operative and inoperative positions, and said second shielding means is operatively connected to said moving means and is moved out of covering position when the housing is moved to inoperative position.

12. The coating thickness measurement device of claim 11 wherein the second shielding means is operatively connected to the moving means by means of a gear train.

13. The coating thickness measurement device of claim 1 wherein said device includes third radiation shielding means positioned between said housing and an operator of said device.

14. The coating thickness measurement device of claim 13 wherein said third shielding means is carried by said device and is pivotable into and out of shielding position with respect to said device.

15. A method of minimizing the exposure of an operator to stray radiation from a device for measuring thickness of a coated part by means of sensing radiation backscatter, said method comprising:
   (a) providing an apertured housing containing a radiation source, said housing including a cover member overlying said aperture and providing a radiation shield;
   (b) positioning said housing in a coating thickness measurement device including a base;
   (c) elevating said housing with respect to said device to permit the removal therefrom of said cover member;
   (d) interposing a second shield in covering relationship with the aperture in said housing;
   (e) positioning a part in underlying relationship to said housing;
   (f) slightly elevating said housing a distance sufficient to permit the lateral displacement of said second shield;
   (g) laterally moving said second shield with respect to the axis of said housing a distance sufficient to clear said housing;
   (h) causing said housing to move into contacting relationship with said part;
   (i) determining the thickness of the coating on the part; and
   (j) moving said housing out of touching relationship with said part and simultaneously moving said second shield into covering relationship with said aperture.

16. The method of claim 15 including the step of interposing a third shield between the operator and the measuring zone of said device to intercept stray radiation during the time between the removal of said second shield from said aperture and its subsequent repositioning in covering relationship therewith.

17. In a measurement device for measuring the thickness of materials, said device including a removable housing which contains a radiation source, the housing having an aperture through which radiation can pass and penetrate the material being measured, and the housing being movable between an operative position where the aperture may be uncovered and an inoperative position where the aperture may be covered, and means for supporting and positioning a part relative to the aperture; the improvement comprising:

first radiation shielding means removably carried by the housing in covering relationship to the aperture; and receiving and holding means carried by said device for receiving and holding said first shielding means, and moving means for imparting relative movement between said housing and said receiving and holding means to permit the removal of said shield from said housing.

18. The measurement device of claim 17 wherein said device includes a second radiation shielding means positioned between said aperture and an operator, said second shielding means being operative when said first shielding means is removed from said housing.

19. The measurement device of claim 18 wherein said device includes a third radiation shielding means movably carried by said device for interposition over said aperture at times when said first shield is removed from said aperture and said housing is not an operative position.

20. The measurement device of claim 19 wherein said third shielding means is remotely manually movable into and out of position relative to said aperture.

21. The measurement device of claim 20 wherein the movement of said third shielding means is coupled to the movement of said housing so that said third shielding means is positioned over said aperture when said housing is not in measuring position and said housing does not carry said first shielding means.

22. A measuring device in measuring the thickness of materials, said device including a removable housing which contains a radiation source, the housing having an aperture through which radiation can pass and penetrate the material being measured;

support means for supporting said housing;

radiation shielding means capable of covering said aperture to attenuate radiation;

a fixture for supporting and positioning a part; and moving means interconnected with the housing and the radiation shielding means and being capable of moving the housing between an operative position wherein the aperture is disposed adjacent said fixture and an inoperative position wherein the aperture is spaced away from said fixture and simultaneously being capable of moving said shielding means between an inoperative position and an operative position wherein said shielding means covers said aperture for the purpose of attenuating radiation when said housing is in an inoperative position.

23. The measuring device set forth in claim 22 further characterized by the provision of additional shielding means which can be removably carried by said housing with said additional shielding means overlying said aperture.

24. The measuring device set forth in claim 23 further characterized by the provision of holding means capable of engaging said additional shielding means when the housing is moved between its operative and inoperative positions to cause removal of said additional shielding means from said housing, said holding means being movable between a first position wherein it overlies said fixture to another position remote from said fixture.

* * * * *